(12) United States Patent
Wundke et al.

(10) Patent No.: US 12,650,525 B1
(45) Date of Patent: Jun. 9, 2026

(54) SYSTEMS AND METHODS FOR ENVIRONMENTAL SENSING USING DOCKED DETECTOR-HUB INTERFACES

(71) Applicant: SunRADON, LLC, Melbourne, FL (US)

(72) Inventors: Kai Wundke, Cocoa, FL (US); Marek Minta, Melbourne Beach, FL (US)

(73) Assignee: SunRADON, LLC, Melbourne, FL (US)

( * ) Notice: Subject to any disclaimer, the term of this patent is extended or adjusted under 35 U.S.C. 154(b) by 0 days.

(21) Appl. No.: 19/380,677

(22) Filed: Nov. 5, 2025

(51) Int. Cl.
| | |
|---|---|
| *G01T 1/178* | (2006.01) |
| *G01T 7/00* | (2006.01) |
| *G01T 7/02* | (2006.01) |

(52) U.S. Cl.
CPC .............. G01T 1/178 (2013.01); G01T 7/005 (2013.01); G01T 7/02 (2013.01)

(58) Field of Classification Search
CPC ............ G01T 1/178; G01T 7/005; G01T 7/02
See application file for complete search history.

(56) References Cited

U.S. PATENT DOCUMENTS

| | | | | |
|---|---|---|---|---|
| 4,920,263 | A * | 4/1990 | Fimian | G01T 1/003 |
| | | | | 250/DIG. 2 |
| 11,341,835 | B1 * | 5/2022 | Hausler | G08B 13/19684 |
| 2016/0252487 | A1 * | 9/2016 | Bhide | G01K 1/14 |
| | | | | 702/50 |
| 2018/0004250 | A1 * | 1/2018 | Barnett | G06F 1/1686 |
| 2018/0224562 | A1 * | 8/2018 | Jewell | G01T 7/00 |
| 2019/0277822 | A1 * | 9/2019 | Chadha | G01N 33/0031 |
| 2022/0344883 | A1 * | 10/2022 | Misener | H01R 13/6658 |
| 2024/0267065 | A1 * | 8/2024 | Bark | H04B 1/03 |
| 2024/0284155 | A1 * | 8/2024 | Lee | G08B 25/10 |
| 2025/0130544 | A1 * | 4/2025 | Misener | G05B 15/02 |

* cited by examiner

*Primary Examiner* — Hugh Maupin
(74) *Attorney, Agent, or Firm* — Pillsbury Winthrop Shaw Pittman, LLP

(57) ABSTRACT

Disclosed is a system that can include an environmental detector having an environmental sensor and a detector electrical contact configured to transfer environmental sensor data. A communication hub can be configured to communicate with the environmental detector and receive the environmental sensor data. The communication hub can include a hub electrical contact configured to electrically connect with the detector electrical contact to enable transfer of the environmental sensor data.

44 Claims, 6 Drawing Sheets

SYSTEMS AND METHODS FOR ENVIRONMENTAL SENSING USING DOCKED DETECTOR-HUB INTERFACES

DESCRIPTION OF THE RELATED ART

Environmental monitoring is performed to monitor and assess conditions in residential, commercial, and industrial environments. For example, determining the presence or concentration of various environmental constituents, including but not limited to gases (e.g., radon, carbon dioxide, carbon monoxide), particulates, temperature, humidity, and other measurable factors. Environmental testing can provide data useful for health, safety, regulatory compliance, or research purposes. Environmental sensors can be deployed at a location of interest and operated for a defined duration to provide data for subsequent analysis. The data can be interpreted to evaluate environmental quality, identify potential hazards, or inform decisions related to remediation, mitigation, or operational adjustments.

SUMMARY

In some aspects, the techniques described herein relate to a system including: an environmental detector including: an environmental sensor; and a detector electrical contact configured to transfer environmental sensor data; and a communication hub configured to communicate with the environmental detector and receive the environmental sensor data, the communication hub including: a hub electrical contact configured to electrically connect with the detector electrical contact to enable transfer of the environmental sensor data.

In some aspects, the techniques described herein relate to a system, wherein the environmental detector is configured to detect radon.

In some aspects, the techniques described herein relate to a system, the environmental detector including a processor configured to convert radon counts to a radon concentration.

In some aspects, the techniques described herein relate to a system, wherein the environmental detector has a detector housing shape complementary to a shape of a cradle on the communication hub and the electrical connection occurs when the environmental detector is in the cradle of the communication hub that the detector electrical contact and the hub electrical contact are in physical contact.

In some aspects, the techniques described herein relate to a system, the environmental detector further including a battery configured to power the environmental sensor.

In some aspects, the techniques described herein relate to a system, wherein the battery is a coin-cell battery.

In some aspects, the techniques described herein relate to a system, wherein the battery is a standard-format battery.

In some aspects, the techniques described herein relate to a system, wherein the environmental detector does not have wireless communication circuitry for communication with a client device.

In some aspects, the techniques described herein relate to a system, the environmental detector further including a power isolator configured to prevent a detector power source from operating the environmental sensor, the power isolator configured to be removed to allow the environmental detector to operate.

In some aspects, the techniques described herein relate to a system, the environmental detector configured to automatically commence operation upon connection with the detector power source.

In some aspects, the techniques described herein relate to a system, the environmental detector further including a temperature sensor configured to monitor an ambient temperature around the environmental detector, the environmental detector configured to record temperature readings from the temperature sensor.

In some aspects, the techniques described herein relate to a system, the environmental detector further including: a clock powered by a power source; and a processor configured to add time stamps to the environmental sensor data stored in a computer memory.

In some aspects, the techniques described herein relate to a system, the environmental detector further including a temperature-humidity-pressure (THP) sensor configured to monitor the ambient temperature, humidity, and pressure around the environmental detector, the environmental detector configured to record the temperature, humidity, and pressure readings from the THP sensor.

In some aspects, the techniques described herein relate to a system, the communication hub further including a cradle with a cradle shape complementary to a detector housing shape of the environmental detector and the electrical connection occurs responsive to the environmental detector being received by the cradle of the communication hub.

In some aspects, the techniques described herein relate to a system, the communication hub further including a starting mechanism that is configured to, responsive to user control, cause the environmental detector to operate.

In some aspects, the techniques described herein relate to a system, the communication hub further including a transmitter configured to provide the environmental sensor data to a client device.

In some aspects, the techniques described herein relate to a system, wherein the transmitter is a wireless transmitter.

In some aspects, the techniques described herein relate to a system, wherein the transmitter is a WiFi or LTE transmitter.

In some aspects, the techniques described herein relate to a system, wherein the transmitter is a wired connection port.

In some aspects, the techniques described herein relate to a system, wherein the transmitter is a USB connection port.

In some aspects, the techniques described herein relate to a system, the communication hub configured to provide a start command to the environmental detector to initiate operation of the environmental sensor.

In some aspects, the techniques described herein relate to a system, the communication hub further including a screen configured to display results of sensing operation(s) by the environmental detector.

In some aspects, the techniques described herein relate to a system, wherein the detector electrical contact and the hub electrical contact are complimentary male/female contacts.

In some aspects, the techniques described herein relate to a system, wherein the detector electrical contact and the hub electrical contact have a poka-yoke configuration.

In some aspects, the techniques described herein relate to a system, wherein the detector electrical contact is configured to mate with the hub electrical contact, the detector electrical contact and hub electrical contact dedicated to one another for transfer of environmental sensor data and not interoperable with standardized public data transfer interfaces.

In some aspects, the techniques described herein relate to a system, the detector electrical contact being non-standardized relative to public data transfer protocols and configured to exclusively couple to the hub electrical contact for transfer of environmental sensor data.

In some aspects, the techniques described herein relate to a system, a detector electrical contact including a custom mating contact configured to physically engage with a corresponding hub electrical contact when the environmental detector is mechanically docked with the communication hub.

In some aspects, the techniques described herein relate to a system, the communication hub further including: at least one programmable processor; and a non-transitory computer readable medium having instructions recorded thereon, the instructions when executed by a computer having the at least one programmable processor causing operations including: generating the environmental sensor data in an electronic format that is not able to be interpreted until a sensing operation of the environmental detector is complete.

In some aspects, the techniques described herein relate to a system, the communication hub further including: at least one programmable processor; and a non-transitory computer readable medium having instructions recorded thereon, the instructions when executed by a computer having the at least one programmable processor causing operations including: initiating a quality control check on the environmental detector automatically when the environmental detector is electrically connected to the communication hub, the quality control check including: delivering test signals to the environmental detector and receiving test data from the environmental detector; determining whether the environmental detector is operating within predetermined specifications; and generating quality control results that are stored in a memory of the communication hub.

In some aspects, the techniques described herein relate to a system, the operations further including: determining that the quality control check is complete and that the environmental detector is operating within the predetermined specifications; and initiating an environmental test that generates the environmental sensor data with the environmental detector.

In some aspects, the techniques described herein relate to a system, the communication hub further including: at least one programmable processor; and a non-transitory computer readable medium having instructions recorded thereon, the instructions when executed by a computer having the at least one programmable processor causing operations including: requiring receipt of an electronic token, such that the environmental sensor data cannot be decrypted until receipt of the electronic token is confirmed.

In some aspects, the techniques described herein relate to a system, wherein the confirmation is direct based on the electronic token being received at the communication hub or a client device.

In some aspects, the techniques described herein relate to a system, wherein the confirmation is indirect based on the electronic token being received and confirmed at another computing system.

In some aspects, the techniques described herein relate to a computer-implemented method for performing a pre-test quality control check of a radon detector, the radon detector including a conductive focusing element, a diode, and a detection circuit, the method including: determining a baseline high-voltage value for the conductive focusing element during a calibration event; obtaining a measured high-voltage value currently applied to the conductive focusing element; determining a baseline amplitude threshold for the detection circuit during the calibration event; injecting a controlled photon signal into the diode via an illumination source; obtaining a measured amplitude threshold at which the detection circuit registers a simulated radon count in response to the controlled photon signal; comparing the measured high-voltage value to the baseline high-voltage value and comparing the measured amplitude threshold to the baseline amplitude threshold; and enabling a radon test when the measured high-voltage value is within an allowable voltage margin from the baseline high-voltage value and the measured amplitude threshold is within an allowable amplitude margin from the baseline amplitude threshold.

In some aspects, the techniques described herein relate to a method, wherein the conductive focusing element is formed of a conductive, non-permeable material and configured to focus charged radon decay products onto the diode when high voltage is applied.

In some aspects, the techniques described herein relate to a method, further including emitting a short-duration, increasing-amplitude photon pulse sequence with the illumination source that includes a light-emitting diode (LED).

In some aspects, the techniques described herein relate to a method, further including: incrementally increasing the photon pulse sequence in amplitude until the detection circuit registers the simulated radon count; comparing the amplitude at which the simulated radon count is registered to the baseline amplitude threshold; and enabling a radon test when the amplitude is within a permissible range from the baseline amplitude threshold.

In some aspects, the techniques described herein relate to a method, further including rejecting photon-induced signals having amplitudes below a detection threshold amplitude to suppress detection of noise spikes.

In some aspects, the techniques described herein relate to a method, wherein the baseline high voltage value and the measured amplitude threshold are those recorded during a most recent calibration event of the radon detector.

In some aspects, the techniques described herein relate to a method, further including recording, in an auditable quality control record, at least a date, time, measured high-voltage value, and measured amplitude threshold associated with the pre-test quality control check.

In some aspects, the techniques described herein relate to a method, further including automatically performing the pre-test quality control check before a radon test without requiring physical side-by-side placement of multiple radon detectors.

In some aspects, the techniques described herein relate to a method, further including requiring receipt of an electronic token, such that the environmental sensor data cannot be decrypted until receipt of the electronic token is confirmed.

In some aspects, the techniques described herein relate to a method, wherein the confirmation is direct based on the electronic token being received at the communication hub or a client device.

In some aspects, the techniques described herein relate to a method, wherein the confirmation is indirect based on the electronic token being received and confirmed at another computing system.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also contemplated that may include one or more processors and one or more memories coupled to the one or more processors. A memory, which can include a computer-readable storage medium, may include, encode, store, or the like, one or more programs that cause one or more processors to perform one or more of the operations described herein. Computer implemented methods consistent with one or more implementations of the current subject matter can be implemented by one or more data processors residing in a single computing system or across multiple computing systems. Such multiple computing systems can be connected and can exchange data and/or commands or other instructions or the like via one or more connections, including but not limited to a connection over a network (e.g., the internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to particular implementations, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

The present disclosure describes environmental detectors that can measure certain aspects of the environment (e.g., radon levels, carbon dioxide (CO2) levels, etc.). Environmental detectors can be provisioned, calibrated, and deployed, including transport to a desired site, connection and activation to initiate testing, etc. The environmental detectors can operate over a selected time after which their environmental sensor data can be collected and communicated to a client device, such as via a communication hub as described herein.

A radon detector can sense alpha particles emitted when radon gas and its "daughters" (polonium, bismuth, lead in the Rn-222 chain) undergo radioactive decay, and infers concentration from the pulses these alphas create in a sensor. In basic form, the instrument can capture a sample for later laboratory spectroscopy ("grab sampling") or measure in situ with a semiconductor detector, e.g., a surface-barrier or carefully made diffusion-junction diode whose depletion region sits near the surface so that impinging alphas deposit their energy there. Because alpha particles from radon and its progeny have fixed energies in the ~5-10 MeV range but travel only about 4 cm in air, events occurring farther from the sensor arrive with reduced energy, so electronics amplify the diode's signal and use a pulse-height discriminator (threshold comparator) to separate likely alpha events from noise. The system then counts pulses and compares the count, over known intervals, to expected rates to estimate radon levels.

Some radon detection systems employ an electrostatic collection or focusing arrangement to improve sensitivity by drawing charged radon progeny toward the sensing surface before they decay. In such arrangements, a conductive enclosure or electrode surrounding the sensing diode can be maintained at a voltage potential different from that of the sensor, establishing an electric field within the detection chamber. Positively charged decay products are attracted toward the oppositely charged sensor surface, where they become plated out. Once deposited, their subsequent alpha decays occur directly on or very near the detector, producing pulses of well-defined energy and substantially reducing the uncertainty associated with decays occurring at variable distances in air. This focusing or collection effect increases counting efficiency, sharpens the energy spectrum of detected events, and decreases the influence of background noise and intermediate air absorption on measured pulse heights. An example of a radon detector is described in U.S. Pat. No. 4,871,914, the contents of which are incorporated by reference.

In some embodiments, the environmental detector can be configured as a CO2 detector. A CO2 detector can employ one or more sensing technologies, such as non-dispersive infrared (NDIR) sensors, optical absorption sensors, or other configurations that quantify CO2 concentration in ambient air.

Figure 1A:
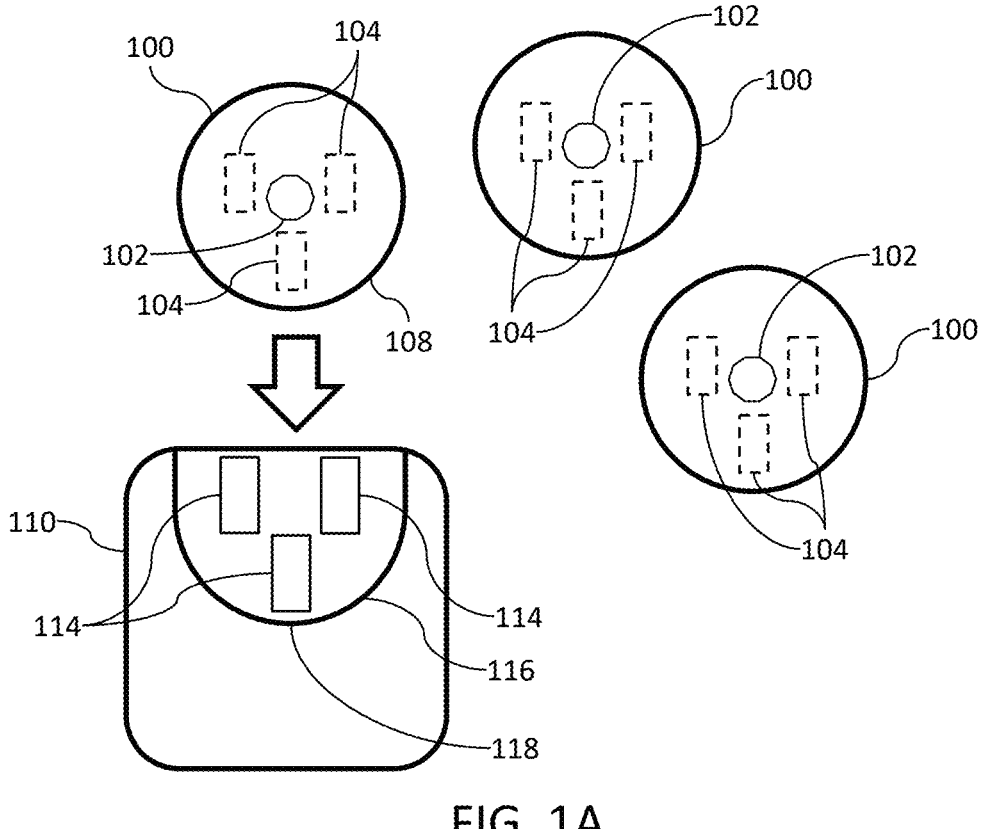
FIG. 1A is a diagram illustrating environmental detectors and a communication hub in accordance with certain aspects of the present disclosure.

FIG. 1A is a diagram illustrating environmental detectors 100 and a communication hub 110. To measure multiple locations in an environment, numerous environmental detectors 100 comprising environmental sensor 102 can be distributed in a space to be tested (e.g., a building, room in a house, storage area, hallway, attics, basements, etc.). Three example environmental detectors 100 are shown in FIG. 1A. As explained in further detail herein, such environmental detectors 100 can take measurements and store environmental sensor data for later analysis or reporting. For example, environmental detectors 100 can include processors configured to convert radon counts to a radon concentration (e.g., utilizing a stored calibration). To access environmental sensor data, environmental detectors 100 can be brought into contact with communication hub 110 where detector electrical contacts 104 can electrically connect with hub electrical contacts 114 to allow a transfer of the environmental sensor data.

Figure 1B:
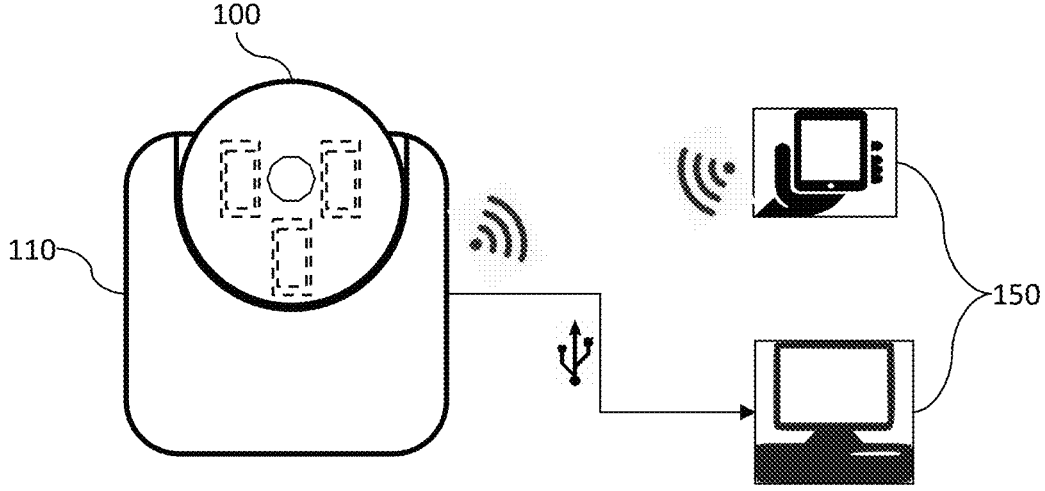
FIG. 1B is a diagram illustrating an environmental detector connected to a communications hub.

FIG. 1B is a diagram illustrating an environmental detector 100 connected to a communications hub 110. Detector electrical contact(s) 104 can be configured to transfer environmental sensor data from environmental detector 100. Communication hub 110 can be configured to communicate with environmental detector 100 and receive the environmental sensor data. This communication can be enabled by hub electrical contact(s) 114 configured to electrically connect with the detector electrical contact(s) 104 to enable transfer of the environmental sensor data. As used herein, "electrically connect" or "electrical connection" between environmental detector 100 and communication hub 110 refers to a physical electrical connection (e.g., metal-to-metal allowing a direct flow of electricity rather than a wireless connection) between the detector electrical contact 104 and the hub electrical contact 114. In some embodiments, data transfer can be continuous while environmental detector 100 is docked and powered, although other modes of data transfer are contemplated that can include interruptions or packet communications. Also, data transfer can optionally pause or resume whenever the detector is undocked or re-seated.

As seen in FIGS. 1A and 1B, in some embodiments environmental detector 100 can have a detector housing shape 108 complementary to shape 118 of cradle 116 on communication hub 110. The electrical connection can occur when environmental detector 100 is in the cradle 116 of the communication hub 110 such that detector electrical contact 104 and hub electrical contact 114 are in physical contact. Cradle 116 can be formed as, for example, a recess, pocket, or slot sized to receive environmental detector 100. In some embodiments, guiding features such as rails, chamfers, or keyed flats can be included to define orientation. Example configurations for making the electrical contact can include flat conductive pads provided on a base surface of environmental detector 100, and spring-loaded pogo pins positioned in cradle 116 floor to contact the pads when seated. In another embodiment, edge-card fingers for detector electrical contacts 104 can slide into a hub electrical contact 114 on a lateral slot of cradle 116. Magnetic elements can be included to assist seating and latching tabs or compliant features can also be included provide retention. Contact location can be selected to minimize strain, for example by placing contacts on a rigid boss or saddle surface within cradle 116.

FIG. 1B also illustrates how, as explained in further detail herein, when (or after) environmental detector 100 is (or has been) in electrical contact with communication hub 110, the environmental sensor data can be transferred to client devices 150. The communication can be, for example, wireless (e.g., cellular or Bluetooth Low Energy (BLE)) or wired (e.g., Universal Serial Bus (USB) or ethernet).

Figure 2:
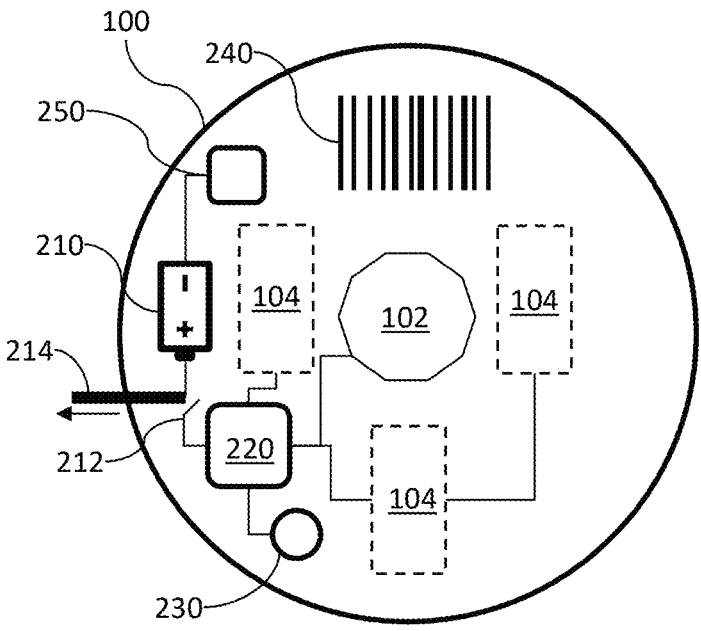
FIG. 2 is a diagram illustrating details of an environmental detector in accordance with certain aspects of the present disclosure.

FIG. 2 is a diagram illustrating details of an environmental detector 100. In some embodiments, environmental detector 100 can include detector power source 210 (e.g., a battery) configured to power environmental sensor 102. In some embodiments, the battery can be a coin-cell battery (e.g., CR2032) mounted to a PCB footprint with spring contacts or a clip. In other embodiments, the battery can be a standard-format battery (e.g., AA or AAA), placed in a compartment with coil and plate terminals and a removable door. Rechargeable batteries can be used in some embodiments. Also, battery sense lines can provide voltage and temperature readings to detector processor 220.

To provide simplified and economical construction, certain embodiments of environmental detector 100 do not have wireless communication circuitry for communication with client device 150. For example, environmental detector 100 can omit radio components (e.g., BLE, Wi-Fi, LTE), antennas, and associated firmware, with communication occurring solely via the physical electrical connection with communication hub 110.

Environmental detector 100 may comprise a power isolator 212 (generically represented in FIG. 2 as a switch)

configured to prevent detector power source 210 from operating environmental sensor 102. In some embodiments, power isolator 212 is configured to be removed to allow the environmental detector 100 to operate. Power isolator 212 can include removable insulating pull tab 214 between a battery terminal and a contact pad, a removable plastic spacer in a battery bay, a removable jumper, or a service-accessible switch. In such arrangements, the environmental detector 100 can be configured to automatically commence operation upon connection with detector power source 210, for example by powering a microcontroller that initializes without additional commands.

In some embodiments, environmental detector 100 can include clock 250 (e.g., a real-time clock) operatively connected to a power source. A processor can add time stamps to some or all of the environmental sensor data that is stored in computer memory. The clock 250 can be furbished during a calibration event of the environmental sensor and sustained until a next calibration event. Clock 250 can be a separate component as shown, but can also be integrated into processor 220 as an on-board computer clock.

In some embodiments, environmental detector 100 can include temperature sensor 230 configured to monitor the ambient temperature around environmental detector 100 and to record temperature readings from temperature sensor 230. In some embodiments, the temperature sensor can be a temperature sensor already included with the detector microprocessor. In some embodiments, the temperature sensor can be a thermistor, RTD, or digital IC placed near an air intake or housing vent. In some embodiments, the environmental detector 100 can include temperature sensor being configured as a temperature-humidity-pressure (THP) sensor that can monitor the ambient temperature, humidity, and pressure around the environmental detector 100. The environmental detector 100 may be configured to record the temperature, humidity, and pressure readings from the THP sensor. A THP sensor can be a MEMS device that provides I2C or SPI outputs for storage with the environmental sensor data, for example. As one benefit, monitoring of sudden changes in environment may point to tempering with the test or to consider when analyzing test results.

In some embodiments, environmental detector 100 can include an identifier 240 that can provide a unique identification of the detector. Identifier 240 can be, for example, a bar code, an RFID chip, an alphanumeric identification formed on the housing, etc.

Figure 3:
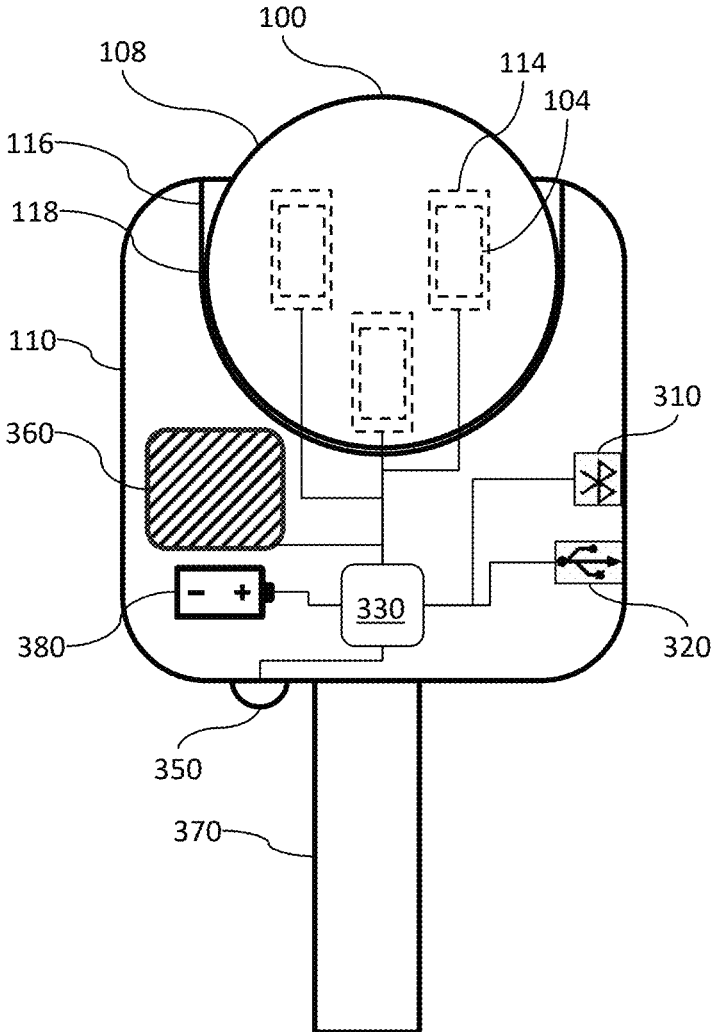
FIG. 3 is a diagram illustrating details of a communication hub in accordance with certain aspects of the present disclosure.

FIG. 3 is a diagram illustrating details of a communication hub 110. Communication hub 110 can include cradle 116 with a cradle shape complementary to a detector housing shape 108 of the environmental detector 100. As shown by the overlapping electrical contacts, the electrical connection can occur responsive to environmental detector 100 being received by cradle 116 of communication hub 110. In some embodiments, cradle 116 can incorporate alignment keys and poka-yoke features to define position. Some embodiments can also include compliant contact carriers to accommodate tolerances. A compliant contact carrier can describe a mounting structure that allows the contacts to flex, compress, or shift slightly to maintain reliable electrical engagement with detector electrical contacts 104 even when minor misalignments or dimensional variations are present. For example, communication hub 110 can use spring-loaded pogo pins mounted in a plastic carrier block, with each pin compressing individually when environmental detector 100 presses against it. In another arrangement, elastomeric connectors (e.g., "zebra strips") made of alternating conductive and insulating silicone layers can be compressed between detector pads and hub pads to establish multiple conductive paths. In some cases, the contact block itself may be mounted on a floating platform supported by springs or compliant grommets, allowing the entire carrier to shift slightly under pressure. In other embodiments, hub electrical contacts 114 can be formed at the end of a flexible printed circuit tongue that bends when environmental detector 100 is docked, thereby ensuring surface-to-surface engagement.

Communication hub 110 can also include one or more transmitters configured to provide the environmental sensor data to a client device 150. In some embodiments, a transmitter can be wireless transmitter 310. Wireless transmitter 310 can be a WiFi or LTE transmitter. In other embodiments, the transmitter can be wired connection port 320, e.g., a USB port. Hub processor 330 can packetize data for transmission via TCP/IP over Wi-Fi or via USB CDC/MSC device classes. In other embodiments, UART, RS-485, or Ethernet ports can be used. Power for hub processor 330 or any connected components can come from hub power supply 380, which can be a battery, AC or DC connection outlet, USB, etc.

In some embodiments, communication hub 110 can be configured to provide a start command to environmental detector 100 to initiate operation of environmental sensor 102. A start command can be a digital logic level on a dedicated contact, an I2C/SPI/UART message, or a pulse sequence interpreted by the detector firmware. In embodiments where a power isolator is implemented, the start command may not be given until the power isolator has been removed. In some embodiments, when the power isolator is removed, the obtained environmental sensor data can be stored on communication hub 110 and retrieved when connected to a client device.

Communication hub 110 can comprise starting mechanism 350 that is configured to, responsive to user control, cause environmental detector 100 to operate. Starting mechanism 350 can be implemented as a mechanical push button, a capacitive touch input, a rotary selector, or a software control on a hub UI that asserts a start line or transmits (e.g., via hub processor 330) a start command through the contacts.

Communication hub 110 can comprise screen 360 configured to display results of sensing operation(s) by environmental detector 100. Screen 360 can be a segment LCD, dot-matrix LCD, or OLED; UI firmware which can display numeric readings, icons, or time series; or comprise other components.

In some embodiments, communication hub 110 comprises handle 370 to allow a user to hold communication hub 110 while connecting/disconnecting with one or more environmental sensors 102.

In certain implementations, detector electrical contact 104 and hub electrical contact 114 are complimentary male/female contacts. In one example, environmental detector 100 can include gold-plated pin contacts of 1.0 mm diameter that insert into cylindrical sockets on communication hub 110. In another example, communication hub 110 can include blade-type contacts that slide into slots on environmental detector 100, forming a plug-and-receptacle arrangement.

In some embodiments, detector electrical contact 104 and hub electrical contact 114 can have a poka-yoke configuration. For instance, one contact may be offset from a central axis so that environmental detector 100 cannot be inserted backwards. Another variation can include keying ridges on communication hub 110 that fit into grooves on the detector housing, ensuring only one possible orientation.

Having described certain embodiments of the environmental detector 100 and the communication hub 110, further details are now provided regarding the detector electrical contacts 104 and the hub electrical contacts 114, which may be included in the disclosed embodiments individually or in various combinations. In some embodiments, detector electrical contact 104 can be configured to mate with hub electrical contact 114, with detector electrical contact 104 and hub electrical contact 114 dedicated to one another for transfer of environmental sensor data and not interoperable with standardized public data transfer interfaces. Other data that can be transferred after contact can include commands/instructions to environmental detector 100 for setting test parameters (e.g., delay, interval, duration, etc.) initiate QC checks, etc. As used herein, the term "not interoperable" means that the custom detector/hub electrical contacts cannot make a usable physical, electrical, or protocol-level connection with standardized public interfaces, and therefore are restricted to functioning exclusively with one another. This lack of interoperability includes at least being unable to communicate using standard, widely-used data transfer interfaces (e.g., USB, Ethernet, Bluetooth, etc.). Such embodiments may be standard in appearance (e.g., a USB-C shell, pogo pins, card edge) as long as the pinout, wiring, or protocol prevents interoperability with public systems.

In some embodiments, detector electrical contact 104 can be non-standardized relative to public data transfer protocols and configured to exclusively couple to the hub electrical contact 114 for transfer of environmental sensor data. As used herein, the phrase "configured to exclusively couple" refers to a detector electrical contact 104 and a hub electrical contact 114 that are arranged or designated so that they operate as a dedicated pair. In other words, the detector electrical contact 104 is designed to couple with the corresponding hub electrical contact 114, and not to interoperate with standardized public data transfer interfaces such as USB, Ethernet, or other general-purpose connectors. The exclusivity can be achieved in different ways, including mechanical arrangement, electrical pinout or voltage assignment, or signaling protocol definition. For example, the contacts can be positioned, keyed, or patterned so that they mate directly with one another, while remaining mechanically or electrically incompatible with publicly standardized connectors. Alternatively or additionally, the contacts can employ commodity conductive elements such as spring pins, pads, or edge connectors, but in an arrangement or configuration that is not interoperable with standardized public protocols. In each case, the detector electrical contact 104 and the hub electrical contact 114 can be made to engage directly with one another to exchange environmental sensor data, while remaining distinct from standardized public data transfer systems.

For example, environmental detector 100 and communication hub 110 can therefore employ a set of contacts designed for direct engagement, where the contact pattern, electrical characteristics, or physical geometry do not correspond to public or standardized connectors. For example, environmental detector 100 can include circular conductive pads on its base arranged in a triangular pattern (e.g., as shown in FIGS. 1-3), while communication hub 110 can include three spring-loaded pogo pins aligned to that pattern (e.g., as also shown in FIGS. 1-3). In another arrangement, environmental detector 100 can include recessed sockets that only accept correspondingly sized hub pins. For instance, a four-pin connector may be arranged in a non-standard rectangular geometry where the spacing does not match USB, and the electrical signaling may use low-voltage differential signaling specific to the detector. In other embodiments, the contacts may be surface pads that form a conductive bridge only when docked in a precise orientation.

In some embodiments, a detector electrical contact 104 comprises a custom mating contact configured to physically engage with a corresponding hub electrical contact 114 when the environmental detector 100 is mechanically docked with the communication hub 110. As used herein, the phrase "custom mating contact" can refer to an electrical interface provided on the environmental detector 100 or the communication hub 110 that is formed with a geometry, arrangement, or layout that is specific to the detector and hub pair. A custom mating contact can include, for example, a uniquely dimensioned plug, socket, or edge connection that is keyed or otherwise arranged so that it physically mates with a corresponding structure on the other device. A custom mating contact can be fabricated as a set of spring-loaded pins, flat conductive pads, edge-card fingers, or other conductive structures that are arranged to align with a complementary pattern on the other device. The contact can be integrated into a docking feature, a recess, a raised surface, or another structural element that ensures that the detector and hub mechanically engage with one another in a defined orientation. A custom mating contact can be formed using commodity conductive elements but arranged, spaced, or packaged in a way that is not interoperable with standard commercial connectors. In one example, the detector can use a curved-edge connector with 12 contacts spaced at 1.27 mm pitch, positioned on a chamfered edge of the housing; the hub can provide a matching spring-contact receptacle. In another example, the detector can include raised dome contacts plated with nickel and gold for durability, while the hub uses elastomeric conductive pads pressed against the domes when docked. Materials can include phosphor-bronze spring elements, gold over nickel plating for low resistance, and housings formed from insulating polymers to prevent shorting, for example.

In some embodiments, detector electrical contact 104 and/or hub electrical contact 114 can be a standardized or otherwise publicly available type, but the communication protocol to transfer data is proprietary in nature.

In some embodiments, environmental detector 100 can record environmental sensor data at specified times, such that data obtained within that time is an integrated measurement (e.g., recorded every 5, 10, or 15 minutes, with each recording being the total number of counts in the window). Specified measurement times can be set at regular intervals, such as every 60 seconds, every 15 minutes, or hourly, or can be defined by events, such as after a fixed number of counts are registered or when an environmental threshold (temperature, humidity) is crossed. In some embodiments, data may be recorded continuously, memory space permitting.

In some embodiments, communication hub 110 can generate the environmental sensor data in an electronic format that is not able to be interpreted until a sensing operation of environmental detector 100 is complete. For example, data can be stored in encrypted binary form, where decryption keys are appended only after the sensing interval ends. In another implementation, environmental sensor data can be stored as blocks of compressed measurements lacking index headers until the final block is written. Data structures can include proprietary binary logs, CSV tables with missing header rows until completion, or JSON files encrypted with AES.

In some embodiments, the system can be configured to require that an electronic token has been received before the environmental sensor data can be decrypted. The confirmation of the electronic token can be direct based on the electronic token being received at the communication hub 110 or at a client device 150 (e.g., the electronic token is present at the communication hub 110 or the client device 150). In some embodiments the confirmation can be indirect (e.g., a validated communication is received at the communication hub 110 that the electronic token has been received and confirmed at another computing system).

Figure 4:
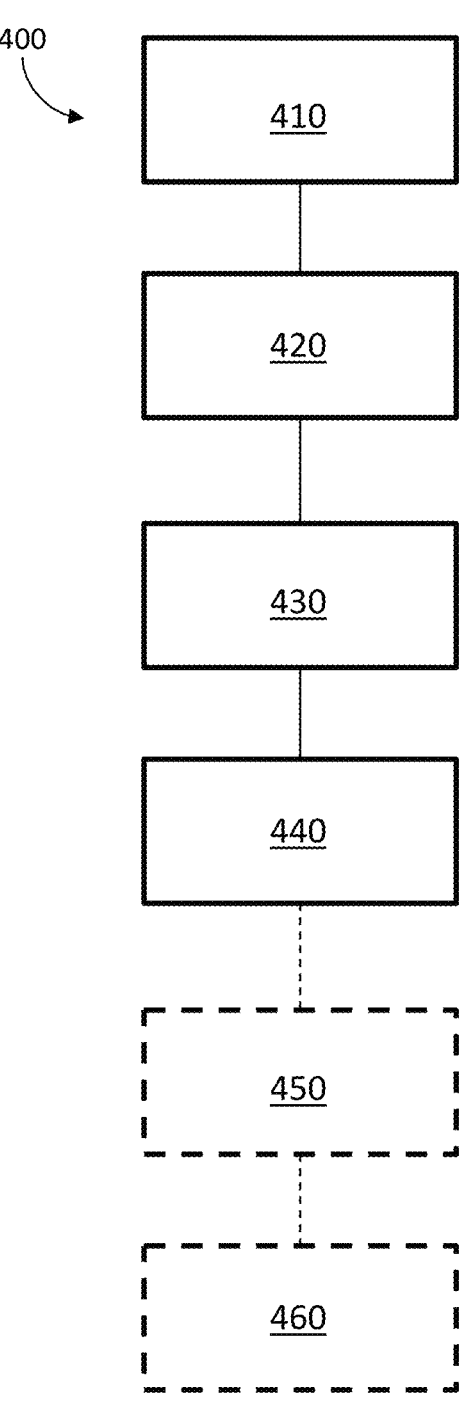
FIG. 4 is a process flow diagram illustrating a method of performing a quality control check on the detector in accordance with certain aspects of the present disclosure.

FIG. 4 is a process flow diagram illustrating a method of performing a quality control check on the environmental detector 100. To confirm that environmental detector 100 is working properly, a quality control check can be performed on the environmental detector 100. In some embodiments, the quality control check can begin as soon as electrical connection is established between the environmental detector 100 and communication hub 110. For example, insertion of environmental detector 100 into the cradle 116 can close a circuit that signals the hub microprocessor to start the quality-control sequence.

At 410, the operation of delivering test signals to the environmental detector 100 can include the hub providing known electrical stimuli to the detector's sensing circuitry. In one implementation, the communication hub 110 can send calibration voltage pulses of a fixed amplitude (e.g., 500 mV) to a signal input path of environmental detector 100. In another implementation, a digital command sequence can be sent to request self-diagnostic data from onboard circuitry.

At 420, the environmental detector 100 responds, and the hub processor can receive test data from the environmental detector 100. This can include measured pulse responses, gain values, high-voltage monitor readings, or other diagnostic parameters transmitted back through the electrical contacts.

At 430, hub processor can then determine whether environmental detector 100 is operating within predetermined specifications. For example, the communication hub 110 may compare measured high-voltage values against a stored baseline of 1000 V±5%. Similarly, a response of environmental detector 100 to calibration pulses can be checked against expected amplitude ranges, such as 200 mV±10%. Values outside these tolerances can be logged as failures. In some embodiments, successes/failures can be logged and retained on environmental detector 100 until a next connection with communication hub 110. After such a connection, the data regarding success/failure can be transferred to communication hub 110 and optionally to other computing systems or client devices.

At 440, a hub processor can then generate quality control results that are stored in a memory of the communication hub 110. Results can include pass/fail indicators, exact numerical readings, detector identification codes, etc. These can be written to non-volatile flash memory, removable storage (e.g., SD card), etc. The quality control results, with the aid of the communication capabilities of communication hub 110, can also be processed by other computing systems or computing clouds.

In some embodiments, additional operations (e.g., operations 450 and 460, below) can occur after the initial quality control test of environmental detector 100.

At 450, in some embodiments, method 400 can include the system determining that the quality control check is complete and that environmental detector 100 is operating within predetermined specifications. For example, once QC has concluded, the hub processor can verify completion status. For example, once all required test parameters—such as detector high-voltage, temperature sensor calibration, and preamplifier gain—are logged as within tolerance, communication hub 110 can set a QC_complete flag in memory.

At 460, in some embodiments, an environmental test can then be initiated that generates the environmental sensor data with the environmental detector 100. If environmental detector 100 is verified to be within predetermined specifications, the communication hub 110 can initiate the start of environmental testing. This may involve sending a digital "start" command to the detector processor, asserting a hardware enable pin, or applying continuous bias voltage to a radon sensing chamber. The environmental detector 100 can then begin generating environmental sensor data, such as time-stamped radon decay counts, which are transmitted back to communication hub 110 for recording.

Figure 5:
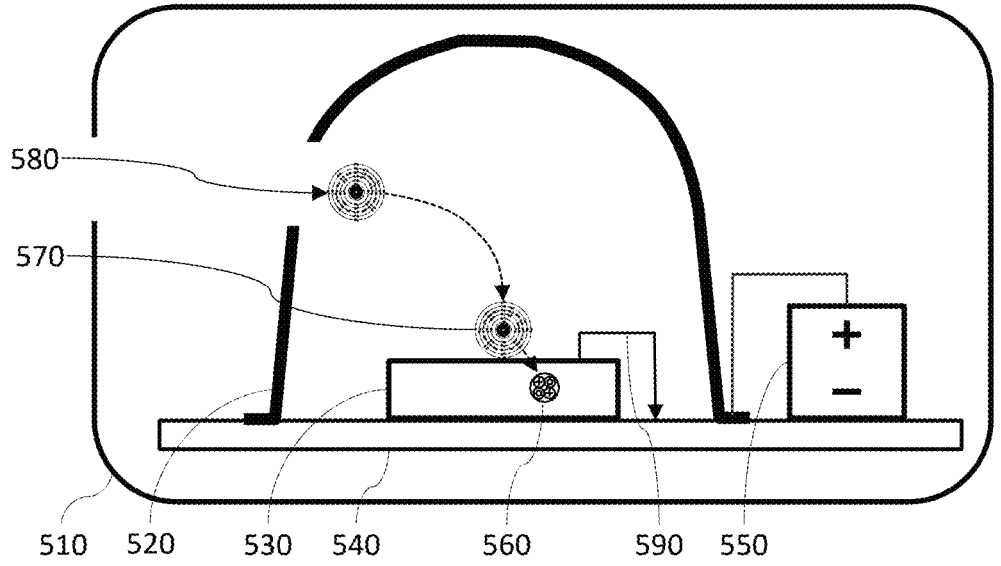
FIG. 5 is a diagram illustrating a radon detector in accordance with certain aspects of the present disclosure.

FIG. 5 is a diagram illustrating a radon detector. The disclosed environmental detectors 100 can be radon detectors. The radon detector in FIG. 5 may be a digital radon detector, for example, a Continuous Radon Monitor (CRM). Digital radon detectors can have numerous advantages over conventional charcoal radon detectors. For example, the information that can be gleaned from a charcoal detector degrades comparatively quickly over time, while the electronic recording of measurements with the digital radon detector can be stored in persistent computer memory.

In operation, such radon detectors can utilize ionization chambers or diodes for detection of charged particles (e.g., due to radon decay). One example of a semiconductor-type radon detector can include conductive focusing element 520, semiconductor diode 530, detection circuit 540, and voltage source 550. Conductive focusing element 520 can be arranged to direct, for example, polonium ion 570, produced by the radioactive decay of radon atom 580, toward the surface of the diode 530. Polonium ion 570 decays thus producing alpha particle 560 that then enters the diode 530 and results in measurable current 590 flowing out of diode 530. Diode 530 can be formed of a semiconductor material and configured as a particle detector, such as a PIN diode, having a depletion region in which charge carriers are generated upon the impact of an alpha particle. The incident alpha particle produces electron-hole pairs within the depletion region, resulting in a transient charge signal. Detection circuit 540 can be electrically coupled to diode 530 and include amplification and signal processing circuitry adapted to receive the charge signal, shape the resulting pulse, and register the occurrence of the alpha particle event. The output of detection circuit 540 can provide data representative of radon decay events and is suitable for use in determining radon concentration in the surrounding environment.

In some embodiments, conductive focusing element 520 can be formed of a conductive, non-permeable material that can provide an ingress path for radon element 580 and focus charged radon decay products (progenies) onto diode 530 when high voltage is applied. Conductive focusing element may be a cylindrical or hemispherical mesh, a flat metal plate, or a shaped electrode made of stainless steel, aluminum, or copper. As used herein, "non-permeable" refers to a material characteristic in which the element is substantially impervious to penetration by alpha particles or other charged decay products resulting from radon decay. By being non-permeable, conductive focusing element 520 can act as a barrier that prevents such particles from passing through the element, thereby ensuring that the particles are instead influenced by the applied electric field and directed toward the active surface of diode 530. In this manner, conductive focusing element 520 not only serves as an electrode for establishing a potential difference, but also functions as a focusing structure that confines and guides radon decay products in a controlled manner suitable for reliable detection.

Figure 6:
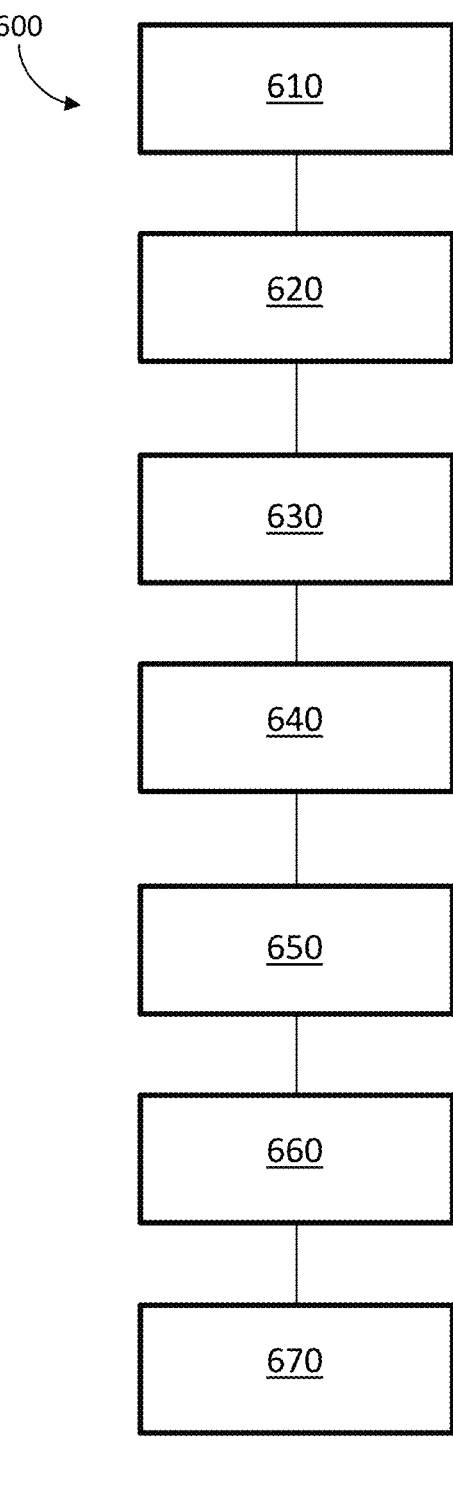
FIG. 6 is a process flow diagram illustrating a pre-test quality control check of a radon detector in accordance with certain aspects of the present disclosure.

FIG. 6 is a process flow diagram illustrating a pre-test quality control check of a radon detector. In some embodiments, a method 600 of performing a pre-test quality control check of a radon detector can include some or all of the following elements, though not necessarily in the described order.

At 610, method 600 can include determining a baseline high-voltage value for the conductive focusing element during a calibration event. For example, at the factory, conductive focusing element may be biased to 1000 V and monitored using a voltage divider circuit connected to an analog-to-digital converter. The resulting digital value can be stored in non-volatile memory as the baseline HV reference.

At 620, method 600 can include obtaining a measured high-voltage value currently applied to conductive focusing element. During the pre-test, communication hub 110 or environmental detector 100 can read the present HV level, such as 985 V, using the same voltage divider and ADC, and stores the reading temporarily for comparison.

At 630, method 600 can include determining a baseline amplitude threshold for the detection circuit during the calibration event. For example, during calibration the environmental detector 100's preamplifier/discriminator threshold may be set to 200 mV, which can be recorded as the baseline value for comparison.

At 640, method 600 can include injecting a controlled photon signal into the diode via an illumination source. For example, an LED positioned adjacent to the diode window may emit short pulses of blue or UV light, simulating charge generation similar to an alpha decay. In embodiments where the illumination source is integrated into environmental detector 100, the LED can be driven by the hub processor through a digital-to-analog driver circuit. In some embodiments, the illumination source can be separate from environmental detector 100 (e.g., shining light into the detector). In some embodiments, method 600 can include emitting a short-duration, increasing-amplitude photon pulse sequence with the illumination source that comprises a light-emitting diode (LED). In some embodiments, the formation of the photon pulse can be controlled to resemble the energy response of the detector circuit to those of Po-214 and Po-218 alpha particle. The LED may be pulsed at widths ranging from 10 ns to 1 ms, with increasing amplitude achieved by raising the drive current in 0.1 mA or 0.5 mA steps. A pulse sequence can incrementally increase the simulated signal strength delivered to the diode. In some embodiments, method 600 can include incrementally increasing the photon pulse sequence in amplitude until the detection circuit registers a simulated radon count and comparing the amplitude at which the simulated radon count is registered to the baseline amplitude threshold. For example, if the detector first registers a simulated count at a 2.5 mA LED drive current corresponding to a 220 mV output, this threshold is compared to the stored baseline of 200 mV±10%. When the amplitude is within a permissible range from the baseline amplitude threshold the radon test can be enabled. This condition can ensure that the threshold sensitivity is sufficiently close to what it was during the calibration event. The permissible range can be, for example, within 10%, 5%, 1%, etc. of the baseline amplitude threshold.

In some embodiments, method 600 can include rejecting photon-induced signals having amplitudes below a detection threshold amplitude to suppress detection of noise spikes. This can be implemented by configuring the discriminator to ignore pulses under 100 mV, filtering out LED noise or background electronic interference. The incremental shaping of the photon pulse aims to amortize the variable sensitivity of the radon detector electronic sensing circuit formed by the tolerances of the electronic passive and active components, thus locking in the expected response threshold for a given energy sensed by the photodetector At 650, method 600 can include obtaining a measured amplitude threshold at which the detection circuit registers a simulated radon count in response to the controlled photon signal. For instance, the LED drive current can be increased incrementally from 0.5 mA upwards until the detection circuit registers a count. If the detection circuit first responds at a 220 mV amplitude, this measured threshold can be stored.

In some embodiments, the baseline high voltage value and the measured amplitude threshold can be those recorded during the most recent calibration event of the radon detector. These values can be stored in EEPROM, flash memory, in hub-resident logs, or on the environmental detector itself and recalled during each pre-test for comparison. Storing on the environmental detector can facilitate exchanging of communication hubs without loss of QC data.

At 660, method 600 can include comparing the measured high-voltage value to the baseline high-voltage value and comparing the measured amplitude threshold to the baseline amplitude threshold. For example, the system can check that the measured HV of 985 V is within ±5% of the 1000 V baseline and that the measured amplitude threshold of 220 mV is within ±10% of the 200 mV baseline.

At 670, method 600 can include enabling a radon test when the measured high-voltage value is within an allowable voltage margin from the baseline high-voltage value and the measured threshold amplitude is within an allowable amplitude margin from the baseline amplitude threshold. If both conditions pass, the detector can be flagged "QC_OK" and can begin an environmental radon test cycle; otherwise, environmental detector 100 may be locked out pending recalibration. In some embodiments, the measured high-voltage value and/or the measured threshold amplitude can be recorded. The recording can be transferred and/or otherwise accessed to, for example, be analyzed after test completion. A user can then review and "validate" that test was done with proper functioning device or "invalidate" the test.

The method can further include recording, in an auditable quality control record, at least the date, time, measured high-voltage value, and measured amplitude threshold associated with the pre-test quality control check. An example log entry might be "2025 Sep. 11 14:30:00, serial no. 12345, HV baseline=1000V, HV pass/fail threshold=50V, HV=985 V, baseline amplitude threshold=200 mV, baseline pass/fail threshold=220 mV, threshold amplitude=220 mV, Result=Pass." Data can be stored in CSV, JSON, or proprietary binary formats, and may also include detector serial number, operator ID, and firmware version.

The disclosed methods can therefore allow automatically performing the pre-test quality control check before a radon test without requiring physical side-by-side placement of multiple radon detectors. For instance, whenever environmental detector 100 is powered on or docked into communication hub 110, the firmware can automatically execute the pre-test method described above, confirming readiness before allowing environmental radon measurements to proceed.

In some embodiments, the system can be configured to have a post-test ability to validate test after completion. This can include performing similar operations as any of the embodiments describing a detector pre-test. This can allow both checks to be performed and so can indicate changes that may have occurred between them. In some embodiments, the QC results can be stored (e.g., on the environmental detector), transmitted (e.g., via the communication hub), and auditable (e.g., at a client computer).

A process can begin with the acquisition of an environmental detector 100. The environmental detector 100 can be calibrated by the manufacturer, optionally prior to being provisioned to a user. Once prepared, the environmental detector 100 can be shipped to a project planning site, which can include, for example, a headquarters, a staging area, a warehouse, or any other location suitable for storage prior to deployment. When needed, one or more environmental detectors 100 can be transported to a property or site where environmental testing is intended to occur.

At the testing site, the environmental detector 100 can be connected (e.g., to communication hub 110) and activated (e.g., establishing power and/or data communication) to enable operation of the detector. A client device 150, such as a mobile application executing on a smartphone or tablet computer, can communicate with the environmental detector 100 via communication hub 110 to access metadata that may be stored in the detector's memory. The environmental detector 100 can then be disconnected from communication hub 110 and placed at a desired location and permitted to conduct environmental testing. The testing can continue for a selected duration, such as one day, two days, four days, or any other suitable period of time.

Upon completion of testing, the environmental detector 100 can be reconnected to a communication hub 110, which can be configured to download and/or process environmental sensor data collected during the testing period. Additional information, such as measurement times, test duration, and test dates, can be provided along with or appended to the environmental sensor data. In some embodiments, the environmental sensor data can be uploaded to a cloud server, which can optionally be maintained by the manufacturer of the environmental detector 100. Analysis of the environmental sensor data can occur at any time, including on the same day the data is uploaded. The environmental sensor data can further be converted into interpretable formats such as comma-separated values (CSV), text, or other suitable formats. In certain embodiments, the interpretable data can be made available for download from a server or other cloud computing platform.

In some embodiments, quality control (QC) data can be transmitted together with the test data. The transmitted QC data can include metadata such as, for example, the detector serial number, device identification code, date and time of the test, calibration reference, test results, pass/fail status, and other recorded parameters associated with the measurement. In some embodiments, the QC data and test data can be sent as a combined data packet, message, or record, and can include additional information such as operator identification, firmware version, environmental readings, instrument configuration settings, etc.

The present disclosure provides numerous advantages and technical capabilities not found in conventional environmental sensors. For example, the environmental sensor can be contained in one body or housing. This can provide a separation of a measurement agent/device (e.g., sensor) from a communication/control agent (e.g., communication hub) while retaining the ability to perform environmental measurements when in the detached/separated mode. The embodiments of the present disclosure can also achieve meeting quality management system criteria as needed.

For Radon, such testing standards/criteria can include: ANSI/AARST MS-PC-2022—*Performance Specifications for Instrumentation Systems Designed to Measure Radon Gas in Air*. These standards can be particularly applicable to the disclosed environmental sensor and communication hub. Another standard met can include ANSI/AARST MS-QA-2023—*Radon Measurements Systems Quality Assurance*. These standards can be particularly applicable to the disclosed quality control systems and methods. Additional standards that can be met and can apply to radon testing can include ANSI/AARST MA-MFLB-2023—*Protocol for Conducting Measurements of Radon and Radon Decay Products in Multifamily, School, Commercial and Mixed-Use Buildings* and ANSI/AARST MAH-2023—*Protocol for Conducting Measurements of Radon and Radon Decay Products in Homes*. While these standards may apply at the time of filing the application, the present disclosure contemplates that the corresponding standards may change over time. Accordingly, the testing capabilities/methods disclosed herein are understood as being able to meet the standards currently applicable to the actual device at the time of use. The combination of environmental detector 100 and communication hub 110 with the communication interfaces allows in-field or over-the-air software/firmware upgrades that can improve measurement performance and also conformance to updated standards placed on CRM devices.

The disclosed method of retrieval of test measurement data and/or results (e.g., via the "cradle"—the communication/control agent, also referred to herein as the communication hub) can enable non-tampering with test results, confidential testing methods, etc. This additional security can result from the configuration of the communication hub and proprietary interfaces. The present disclosure thus provides numerous advantages not present in the fields of environmental sensing (e.g., radon measurement).

In the following, further features, characteristics, and exemplary technical solutions of the present disclosure will be described in terms of items that may be optionally claimed in any combination:

Clause 1. A system comprising: an environmental detector comprising: an environmental sensor; and a detector electrical contact configured to transfer environmental sensor data; and a communication hub configured to communicate with the environmental detector and receive the environmental sensor data, the communication hub comprising: a hub electrical contact configured to electrically connect with the detector electrical contact to enable transfer of the environmental sensor data.

Clause 2. The system of clause 1, wherein the environmental detector is configured to detect radon.

Clause 3. The system of clause 1, the environmental detector comprising a processor configured to convert radon counts to a radon concentration.

Clause 4. The system of clause 1, wherein the environmental detector has a detector housing shape complementary to a shape of a cradle on the communication hub and the electrical connection occurs when the environmental detector is in the cradle of the communication hub that the detector electrical contact and the hub electrical contact are in physical contact.

Clause 5. The system of clause 1, the environmental detector further comprising a battery configured to power the environmental sensor.

Clause 6. The system of clause 5, wherein the battery is a coin-cell battery.

Clause 7. The system of clause 5, wherein the battery is a standard-format battery.

Clause 8. The system of clause 1, wherein the environmental detector does not have wireless communication circuitry for communication with a client device.

Clause 9. The system of clause 1, the environmental detector further comprising a power isolator configured to prevent a detector power source from operating the environmental sensor, the power isolator configured to be removed to allow the environmental detector to operate.

Clause 10. The system of clause 9, the environmental detector configured to automatically commence operation upon connection with the detector power source.

Clause 11. The system of clause 1, the environmental detector further comprising a temperature sensor configured to monitor an ambient temperature around the environmental detector, the environmental detector configured to record temperature readings from the temperature sensor.

Clause 12. The system of clause 1, the environmental detector further comprising: a clock powered by a power source; and a processor configured to add time stamps to the environmental sensor data stored in a computer memory.

Clause 13. The system of clause 11, the environmental detector further comprising a temperature-humidity-pressure (THP) sensor configured to monitor the ambient temperature, humidity, and pressure around the environmental detector, the environmental detector configured to record the temperature, humidity, and pressure readings from the THP sensor.

Clause 14. The system of clause 1, the communication hub further comprising a cradle with a cradle shape complementary to a detector housing shape of the environmental detector and the electrical connection occurs responsive to the environmental detector being received by the cradle of the communication hub.

Clause 15. The system of clause 1, the communication hub further comprising a starting mechanism that is configured to, responsive to user control, cause the environmental detector to operate.

Clause 16. The system of clause 1, the communication hub further comprising a transmitter configured to provide the environmental sensor data to a client device.

Clause 17. The system of clause 16, wherein the transmitter is a wireless transmitter.

Clause 18. The system of clause 17, wherein the transmitter is a WiFi or LTE transmitter.

Clause 19. The system of clause 16, wherein the transmitter is a wired connection port.

Clause 20. The system of clause 17, wherein the transmitter is a USB connection port.

Clause 21. The system of clause 1, the communication hub configured to provide a start command to the environmental detector to initiate operation of the environmental sensor.

Clause 22. The system of clause 1, the communication hub further comprising a screen configured to display results of sensing operation(s) by the environmental detector.

Clause 23. The system of clause 1, wherein the detector electrical contact and the hub electrical contact are complimentary male/female contacts.

Clause 24. The system of clause 1, wherein the detector electrical contact and the hub electrical contact have a poka-yoke configuration.

Clause 25. The system of clause 1, wherein the detector electrical contact is configured to mate with the hub electrical contact, the detector electrical contact and hub electrical contact dedicated to one another for transfer of environmental sensor data and not interoperable with standardized public data transfer interfaces.

Clause 26. The system of clause 25, the detector electrical contact being non-standardized relative to public data transfer protocols and configured to exclusively couple to the hub electrical contact for transfer of environmental sensor data.

Clause 27. The system of clause 25, a detector electrical contact comprising a custom mating contact configured to physically engage with a corresponding hub electrical contact when the environmental detector is mechanically docked with the communication hub.

Clause 28. The system of clause 1, the communication hub further comprising: at least one programmable processor; and a non-transitory computer readable medium having instructions recorded thereon, the instructions when executed by a computer having the at least one programmable processor causing operations comprising: generating the environmental sensor data in an electronic format that is not able to be interpreted until a sensing operation of the environmental detector is complete.

Clause 29. The system of clause 1, the communication hub further comprising: at least one programmable processor; and a non-transitory computer readable medium having instructions recorded thereon, the instructions when executed by a computer having the at least one programmable processor causing operations comprising: initiating a quality control check on the environmental detector automatically when the environmental detector is electrically connected to the communication hub, the quality control check comprising: delivering test signals to the environmental detector and receiving test data from the environmental detector; determining whether the environmental detector is operating within predetermined specifications; and generating quality control results that are stored in a memory of the communication hub.

Clause 30. The system of clause 29, the operations further comprising: determining that the quality control check is complete and that the environmental detector is operating within the predetermined specifications; and initiating an environmental test that generates the environmental sensor data with the environmental detector.

Clause 31. The system of clause 1, the communication hub further comprising: at least one programmable processor; and a non-transitory computer readable medium having instructions recorded thereon, the instructions when executed by a computer having the at least one programmable processor causing operations comprising: requiring receipt of an electronic token, such that the environmental sensor data cannot be decrypted until receipt of the electronic token is confirmed.

Clause 32. The system of clause 31, wherein the confirmation is direct based on the electronic token being received at the communication hub or a client device.

Clause 33. The system of clause 31, wherein the confirmation is indirect based on the electronic token being received and confirmed at another computing system.

Clause 34. A computer-implemented method for performing a pre-test quality control check of a radon detector, the radon detector comprising a conductive focusing element, a diode, and a detection circuit, the method comprising:

determining a baseline high-voltage value for the conductive focusing element during a calibration event; obtaining a measured high-voltage value currently applied to the conductive focusing element; determining a baseline amplitude threshold for the detection circuit during the calibration event; injecting a controlled photon signal into the diode via an illumination source; obtaining a measured amplitude threshold at which the detection circuit registers a simulated radon count in response to the controlled photon signal; comparing the measured high-voltage value to the baseline high-voltage value and comparing the measured amplitude threshold to the baseline amplitude threshold; and enabling a radon test when the measured high-voltage value is within an allowable voltage margin from the baseline high-voltage value and the measured amplitude threshold is within an allowable amplitude margin from the baseline amplitude threshold.

Clause 35. The method of clause 34, wherein the conductive focusing element is formed of a conductive, non-permeable material and configured to focus charged radon decay products onto the diode when high voltage is applied.

Clause 36. The method of clause 34, further comprising emitting a short-duration, increasing-amplitude photon pulse sequence with the illumination source that comprises a light-emitting diode (LED).

Clause 37. The method of clause 36, further comprising: incrementally increasing the photon pulse sequence in amplitude until the detection circuit registers the simulated radon count; comparing the amplitude at which the simulated radon count is registered to the baseline amplitude threshold; and enabling a radon test when the amplitude is within a permissible range from the baseline amplitude threshold.

Clause 38. The method of clause 34, further comprising rejecting photon-induced signals having amplitudes below a detection threshold amplitude to suppress detection of noise spikes.

Clause 39. The method of clause 34, wherein the baseline high voltage value and the measured amplitude threshold are those recorded during a most recent calibration event of the radon detector.

Clause 40. The method of clause 34, further comprising recording, in an auditable quality control record, at least a date, time, measured high-voltage value, and measured amplitude threshold associated with the pre-test quality control check.

Clause 41. The method of clause 34, further comprising automatically performing the pre-test quality control check before a radon test without requiring physical side-by-side placement of multiple radon detectors.

Clause 42. The method of clause 34, further comprising requiring receipt of an electronic token, such that the environmental sensor data cannot be decrypted until receipt of the electronic token is confirmed.

Clause 43. The method of clause 42, wherein the confirmation is direct based on the electronic token being received at the communication hub or a client device.

Clause 44. The method of clause 42, wherein the confirmation is indirect based on the electronic token being received and confirmed at another computing system.

The present disclosure contemplates that the calculations disclosed in the embodiments herein may be performed in a number of ways, applying the same concepts taught herein, and that such calculations are equivalent to the embodiments disclosed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (or "computer readable medium") refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" (or "computer readable signal") refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, computer programs and/or articles depending on the desired configuration. Any methods or the logic flows depicted in the accompanying figures and/or described herein do not necessarily require the particular order shown, or sequential order, to achieve desirable results. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. The implementations described above can be directed to various combinations and subcombinations of the disclosed features and/or combinations and subcombinations of further features noted above. Furthermore, above described advantages are not intended to limit the application of any issued claims to processes and structures accomplishing any or all of the advantages.

Additionally, section headings shall not limit or characterize the invention(s) set out in any claims that may issue from this disclosure. Further, the description of a technology in the "Background" is not to be construed as an admission that technology is prior art to any invention(s) in this disclosure. Neither is the "Summary" to be considered as a characterization of the invention(s) set forth in issued claims. Furthermore, any reference to this disclosure in general or use of the word "invention" in the singular is not intended to imply any limitation on the scope of the claims set forth below. Multiple inventions may be set forth according to the limitations of the multiple claims issuing from this disclosure, and such claims accordingly define the invention(s), and their equivalents, that are protected thereby.

What is claimed is:

1. A system comprising:
an environmental detector comprising:
an environmental sensor; and
a detector electrical contact configured to transfer environmental sensor data;
a communication hub configured to communicate with the environmental detector and receive the environmental sensor data, the communication hub comprising:
a hub electrical contact configured to electrically connect with the detector electrical contact to enable transfer of the environmental sensor data;
at least one programmable processor; and
a non-transitory computer readable medium having instructions recorded thereon, the instructions when executed by a computer having the at least one programmable processor causing operations comprising:

requiring receipt of an electronic token, such that the environmental sensor data cannot be decrypted until receipt of the electronic token is confirmed.

2. The system of claim 1, wherein the environmental detector is configured to detect radon.

3. The system of claim 1, wherein the environmental detector has a detector housing shape complementary to a shape of a cradle on the communication hub and the electrical connection occurs when the environmental detector is in the cradle of the communication hub such that the detector electrical contact and the hub electrical contact are in physical contact.

4. The system of claim 1, the environmental detector further comprising a battery configured to power the environmental sensor.

5. The system of claim 1, wherein the environmental detector does not have wireless communication circuitry for communication with a client device.

6. The system of claim 1, the environmental detector further comprising a power isolator configured to prevent a detector power source from operating the environmental sensor, the power isolator configured to be removed to allow the environmental detector to operate.

7. The system of claim 6, the environmental detector configured to automatically commence operation upon connection with the detector power source.

8. The system of claim 1, the environmental detector further comprising:

a clock powered by a power source; and a processor configured to add time stamps to the environmental sensor data stored in a computer memory.

9. The system of claim 1, the communication hub further comprising a cradle with a cradle shape complementary to a detector housing shape of the environmental detector and the electrical connection occurs responsive to the environmental detector being received by the cradle of the communication hub.

10. The system of claim 1, the communication hub further comprising a transmitter configured to provide the environmental sensor data to a client device.

11. The system of claim 1, wherein the detector electrical contact is configured to mate with the hub electrical contact, the detector electrical contact and hub electrical contact dedicated to one another for transfer of environmental sensor data and not interoperable with standardized public data transfer interfaces.

12. The system of claim 11, the detector electrical contact being non-standardized relative to public data transfer protocols and configured to exclusively couple to the hub electrical contact for transfer of environmental sensor data.

13. The system of claim 11, a detector electrical contact comprising a custom mating contact configured to physically engage with a corresponding hub electrical contact when the environmental detector is mechanically docked with the communication hub.

14. The system of claim 1, the communication hub further comprising:

at least one programmable processor; and a non-transitory computer readable medium having instructions recorded thereon, the instructions when executed by a computer having the at least one programmable processor causing operations comprising:

generating the environmental sensor data in an electronic format that is not able to be interpreted until a sensing operation of the environmental detector is complete.

15. The system of claim 1, the communication hub further comprising:

at least one programmable processor; and a non-transitory computer readable medium having instructions recorded thereon, the instructions when executed by a computer having the at least one programmable processor causing operations comprising:

initiating a quality control check on the environmental detector automatically when the environmental detector is electrically connected to the communication hub, the quality control check comprising:

delivering test signals to the environmental detector and receiving test data from the environmental detector;

determining whether the environmental detector is operating within predetermined specifications; and generating quality control results that are stored in a memory of the communication hub.

16. The system of claim 15, the operations further comprising:

determining that the quality control check is complete and that the environmental detector is operating within the predetermined specifications; and initiating an environmental test that generates the environmental sensor data with the environmental detector.

17. The system of claim 1, wherein the confirmation is direct based on the electronic token being received at the communication hub or a client device.

18. The system of claim 1, wherein the confirmation is indirect based on the electronic token being received and confirmed at another computing system.

19. A computer-implemented method for performing a pre-test quality control check of a radon detector, the radon detector comprising a conductive focusing element, a diode, and a detection circuit, the method comprising:

determining a baseline high-voltage value for the conductive focusing element during a calibration event;

obtaining a measured high-voltage value currently applied to the conductive focusing element;

determining a baseline amplitude threshold for the detection circuit during the calibration event;

injecting a controlled photon signal into the diode via an illumination source;

obtaining a measured amplitude threshold at which the detection circuit registers a simulated radon count in response to the controlled photon signal;

comparing the measured high-voltage value to the baseline high-voltage value and comparing the measured amplitude threshold to the baseline amplitude threshold; and enabling a radon test when the measured high-voltage value is within an allowable voltage margin from the baseline high-voltage value and the measured amplitude threshold is within an allowable amplitude margin from the baseline amplitude threshold.

20. The method of claim 19, wherein the conductive focusing element is formed of a conductive, non-permeable material and configured to focus charged radon decay products onto the diode when high voltage is applied.

21. The method of claim 19, further comprising emitting a short-duration, increasing-amplitude photon pulse sequence with the illumination source that comprises a light-emitting diode (LED).

22. The method of claim 21, further comprising:

incrementally increasing the photon pulse sequence in amplitude until the detection circuit registers the simulated radon count;

comparing the amplitude at which the simulated radon count is registered to the baseline amplitude threshold; and enabling a radon test when the amplitude is within a permissible range from the baseline amplitude threshold.

23. The method of claim 19, further comprising rejecting photon-induced signals having amplitudes below a detection threshold amplitude to suppress detection of noise spikes.

24. The method of claim 19, wherein the baseline high-voltage value and the measured amplitude threshold are those recorded during a most recent calibration event of the radon detector.

25. The method of claim 19, further comprising recording, in an auditable quality control record, at least a date, time, measured high-voltage value, and measured amplitude threshold associated with the pre-test quality control check.

26. The method of claim 19, further comprising automatically performing the pre-test quality control check before a radon test without requiring physical side-by-side placement of multiple radon detectors.

27. The method of claim 19, further comprising requiring receipt of an electronic token, such that environmental sensor data cannot be decrypted until receipt of the electronic token is confirmed.

28. The method of claim 27, wherein the confirmation is direct based on the electronic token being received at a communication hub or a client device.

29. The method of claim 27, wherein the confirmation is indirect based on the electronic token being received and confirmed at another computing system.

30. A system comprising:

an environmental detector comprising:

an environmental sensor; and a detector electrical contact configured to transfer environmental sensor data; and a communication hub configured to communicate with the environmental detector and receive the environmental sensor data, the communication hub comprising:

a hub electrical contact configured to electrically connect with the detector electrical contact to enable transfer of the environmental sensor data;

at least one programmable processor; and a non-transitory computer readable medium having instructions recorded thereon, the instructions when executed by a computer having the at least one programmable processor causing operations comprising:

initiating a quality control check on the environmental detector automatically when the environmental detector is electrically connected to the communication hub, the quality control check comprising:

delivering test signals to the environmental detector and receiving test data from the environmental detector;

determining whether the environmental detector is operating within predetermined specifications; and

26 generating quality control results that are stored in a memory of the communication hub.

31. The system of claim 30, wherein the environmental detector is configured to detect radon.

32. The system of claim 30, wherein the environmental detector has a detector housing shape complementary to a shape of a cradle on the communication hub and the electrical connection occurs when the environmental detector is in the cradle of the communication hub such that the detector electrical contact and the hub electrical contact are in physical contact.

33. The system of claim 30, the environmental detector further comprising a battery configured to power the environmental sensor.

34. The system of claim 30, wherein the environmental detector does not have wireless communication circuitry for communication with a client device.

35. The system of claim 30, the environmental detector further comprising a power isolator configured to prevent a detector power source from operating the environmental sensor, the power isolator configured to be removed to allow the environmental detector to operate.

36. The system of claim 35, the environmental detector configured to automatically commence operation upon connection with the detector power source.

37. The system of claim 30, the environmental detector further comprising:

a clock powered by a power source; and a processor configured to add time stamps to the environmental sensor data stored in a computer memory.

38. The system of claim 30, the communication hub further comprising a cradle with a cradle shape complementary to a detector housing shape of the environmental detector and the electrical connection occurs responsive to the environmental detector being received by the cradle of the communication hub.

39. The system of claim 30, the communication hub further comprising a transmitter configured to provide the environmental sensor data to a client device.

40. The system of claim 30, wherein the detector electrical contact is configured to mate with the hub electrical contact, the detector electrical contact and hub electrical contact dedicated to one another for transfer of environmental sensor data and not interoperable with standardized public data transfer interfaces.

41. The system of claim 40, the detector electrical contact being non-standardized relative to public data transfer protocols and configured to exclusively couple to the hub electrical contact for transfer of environmental sensor data.

42. The system of claim 40, a detector electrical contact comprising a custom mating contact configured to physically engage with a corresponding hub electrical contact when the environmental detector is mechanically docked with the communication hub.

43. The system of claim 30, the communication hub further comprising:

at least one programmable processor; and a non-transitory computer readable medium having instructions recorded thereon, the instructions when executed by a computer having the at least one programmable processor causing operations comprising:

generating the environmental sensor data in an electronic format that is not able to be interpreted until a sensing operation of the environmental detector is complete.

44. The system of claim 30, the operations further comprising:

determining that the quality control check is complete and that the environmental detector is operating within the predetermined specifications; and initiating an environmental test that generates the environmental sensor data with the environmental detector.

\* \* \* \* \*